UNITED STATES PATENT OFFICE.

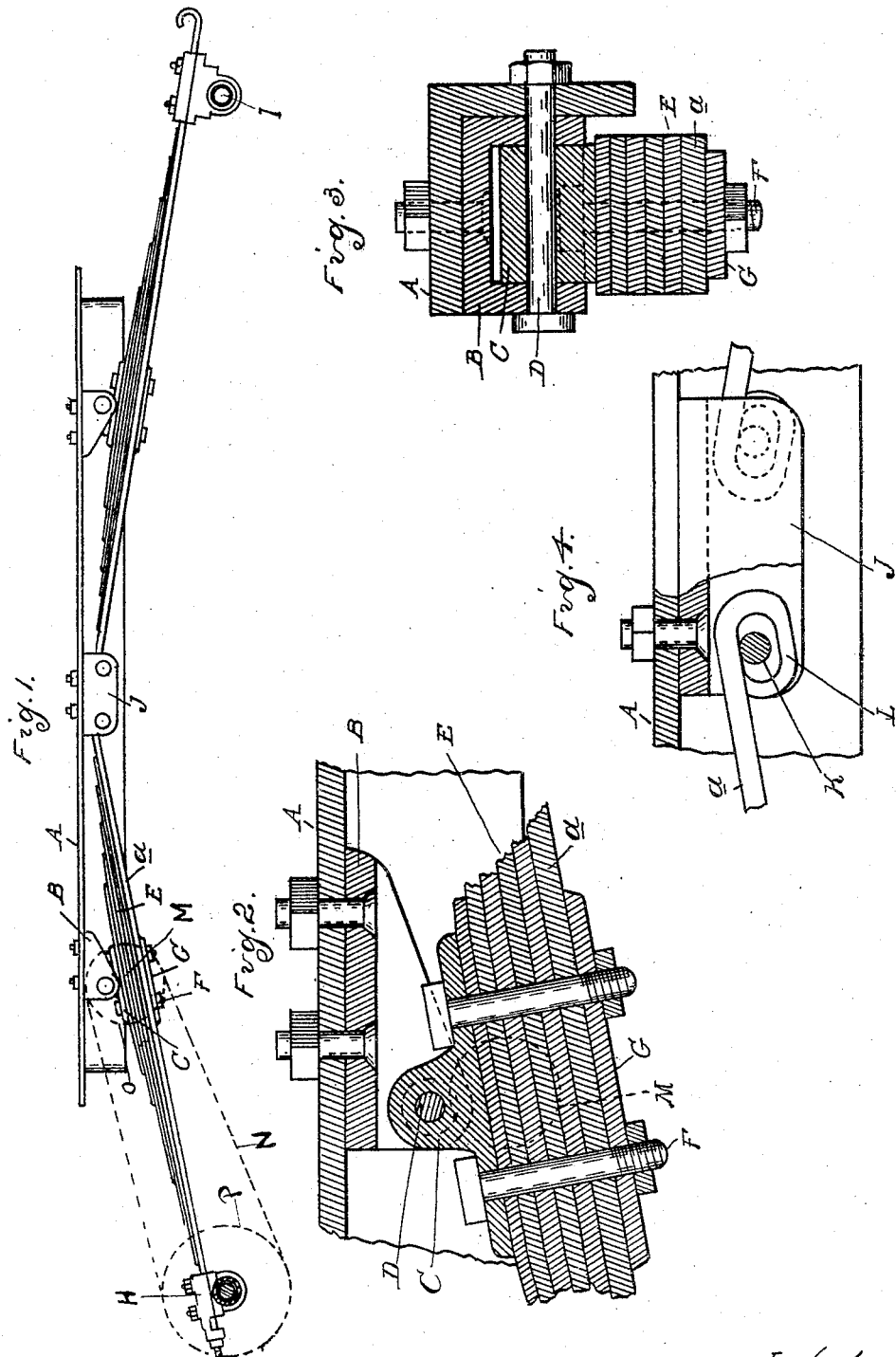

NORMAN T. HARRINGTON, OF DETROIT, MICHIGAN, ASSIGNOR TO OLDS MOTOR WORKS, OF DETROIT, MICHIGAN, A CORPORATION OF MICHIGAN.

VEHICLE-SPRING.

No. 796,405.

Specification of Letters Patent.

Patented Aug. 1, 1905.

Application filed December 19, 1904. Serial No. 237,446.

*To all whom it may concern:*

Be it known that I, NORMAN T. HARRINGTON, a citizen of the United States, residing at Detroit, in the county of Wayne and State of Michigan, have invented certain new and useful Improvements in Vehicle-Springs, of which the following is a specification, reference being had therein to the accompanying drawings.

The invention relates to vehicle-springs, and is more particularly designed for use on motor-vehicles.

In the drawings, Figure 1 is an elevation of the spring. Fig. 2 is an enlarged view of a portion of said spring. Fig. 3 is a cross-section thereof, and Fig. 4 is an enlarged view of the inner end portion of the spring and its connections.

My improved construction of vehicle-spring relates more particularly to that type in which the axle is secured to the free ends of a pair of downwardly-inclined spring-arms, the upper ends of which are secured to the vehicle-frame. With such constructions it is usual to locate the drive-shaft of the motor approximately in line with the point of attachment of the spring to the frame, so that the drive-chain extending from the sprocket of said drive-shaft to the one on the axle will not be greatly changed in tension by the flexing of the spring. Inasmuch, however, as the flexing of the spring changes its curvature, the distance between the axle and the drive-shaft is never maintained constant in all positions of the spring, and where there is a marked deflection of the spring the change in distance is greatest. Another incident in the usual construction of springs of this type is that the length of the spring is necessarily limited to considerably less than one-half the distance between the forward and rear axles. This is for the reason that the spring-arms must be attached to the frame some distance upon opposite sides of the center thereof.

My improvement consists, essentially, in substituting for the rigid attachment of the spring to the frame a pivotal attachment and in extending this spring inward beyond the point of attachment to the frame, so as to form a second spring-arm. This arm is secured at its end to the vehicle-frame and operates as an auxiliary to the downwardly-projecting spring-arm, resulting in distributing the deflection of the spring over the two arms. Thus a much greater resiliency is obtained with the same strength of spring than in prior instances, and by locating the drive-shaft approximately in line with the pivot there will be a slight alteration in the distance between the same and the axle.

As shown, A is one of the side sills or frame-bars of the vehicle, which is illustrated as an angle-bar. B is a bifurcated member secured to the under side of the bar A, and C is a member pivoted between the furcations of the member B by a bolt or pin D. This bolt preferably extends through a vertical web of the frame angle-bar and in addition to its function as a pivot forms a securing means for the member B. E is a spring. This is preferably in the form of a leaf-spring, the several leaves being clamped to the member C by bolts F passing through registering apertures therein and in a bottom plate G.

The lower leaf *a* of the spring is preferably of greater thickness than the other leaves and at its outer end is provided with a fitting H for connecting thereto the axle I, this being of any suitable construction. The opposite end of the lower leaf *a* slidingly engages with a bearing on the frame, this being preferably formed by a bifurcated bracket J, depending from said frame, between the furcations of which the leaf passes, and a pin K. This pin extends across between the furcations of the bracket J and engages with a loop L, preferably integrally formed with the lower leaf *a*.

With the construction as described whenever the spring is flexed under load or by the striking of the vehicle-wheels against an obstruction or into a rut the stress will be distributed throughout the entire length of the spring. This will cause the rotation of the fitting C on the pivot D and the simultaneous outward bowing of the inward-extending arm and upward bowing of the outward-extending arm. The drive-shaft M is preferably located, as indicated in dotted lines, near the pivot D, and thus the drive-chain N, connecting the sprocket O on said shaft with the sprocket P on the axle, will be but slightly changed in tension.

While I have illustrated a straight spring, it is evident that its form may be changed to a curve or any other suitable shape. The springs for the forward and rear axle are preferably similar in construction, and their adjacent inner ends may be secured to the same bracket J.

What I claim as my invention is—

1. In a vehicle, the combination with a frame and an axle, of a combined reach and spring longitudinally extending and having a rigid fulcrum-bearing on said frame, the outer end of said arm being connected to said axle and the inner end slidably secured to said frame.

2. In a vehicle, the combination with a frame and an axle, of a combined reach and spring longitudinally extending and arm having its outer end secured to said axle and its inner end slidably engaging said frame, and a rigid fulcrum-bearing secured to said frame and pivotally engaging said spring intermediate its ends.

3. In a vehicle, the combination with the frame and the axle, of a longitudinally-extending combined reach and spring-arm at its outer end secured to said axle and at its inner end slidably connected to said frame, and a bearing on said frame engaging said spring intermediate its ends and holding the same from lateral movement.

4. In a vehicle, the combination with a frame and an axle, of a longitudinally-extending combined reach and spring tapering toward its opposite ends, one end being secured to said axle and the other slidably connected to said frame, and a rigid fulcrum-bearing on said frame pivotally engaging the central portion of said spring.

5. In a vehicle, the combination with the frame and the axle, of a longitudinally-extending combined reach and spring composed of leaves approximately reinforcing the springs from ends to center, the outer end of said spring being secured to said axle and the inner end slidably connected to said frame, and a fulcrum-bearing rigidly secured to said frame and pivotally engaging the central portion of said spring.

6. In a vehicle, the combination with the frame and the axle, of a longitudinally-extending leaf-spring tapering toward its opposite ends and adapted to act as a reach, the outer end being secured to said axle and the inner end slidably connected to said frame, a fulcrum-bracket secured to said frame and depending therefrom and a member rigidly clamped to the central portion of said spring and pivotally engaging said fulcrum-bracket.

7. In a vehicle, the combination with the frame and the axle, of a double-tapering leaf-spring acting as reach and spring combined extending longitudinally of said frame, and secured at its outer end to said axle, a bifurcated fulcrum-bracket depending from said frame, a member rigidly clamped to the central portion of said spring, pivotally engaging with and embraced by said fulcrum member, a depending bifurcated bracket on said frame embracing the inner end of said spring, and a pin secured in said bracket and longitudinally adjustably engaging the inner end of said spring.

8. In a vehicle, the combination with a frame and axle, of a combined reach and spring having a fulcrum intermediate its ends, rigidly secured to said frame, one end of said spring being rigidly secured to said axle, and the other end slidably attached to said frame.

In testimony whereof I affix my signature in presence of two witnesses.

NORMAN T. HARRINGTON.

Witnesses:
  Ed. D. Ault,
  H. G. Smith.